3,158,929
NUCLEAR REACTOR FUEL ELEMENTS
Alan Frederick Taylor, Preston, and James Thomas Stockdale, Lea Preston, England, assignors to United Kingdom Atomic Energy Authority, London, England
Filed Aug. 3, 1961, Ser. No. 129,014
Claims priority, application Great Britain Aug. 4, 1960
2 Claims. (Cl. 29—474.4)

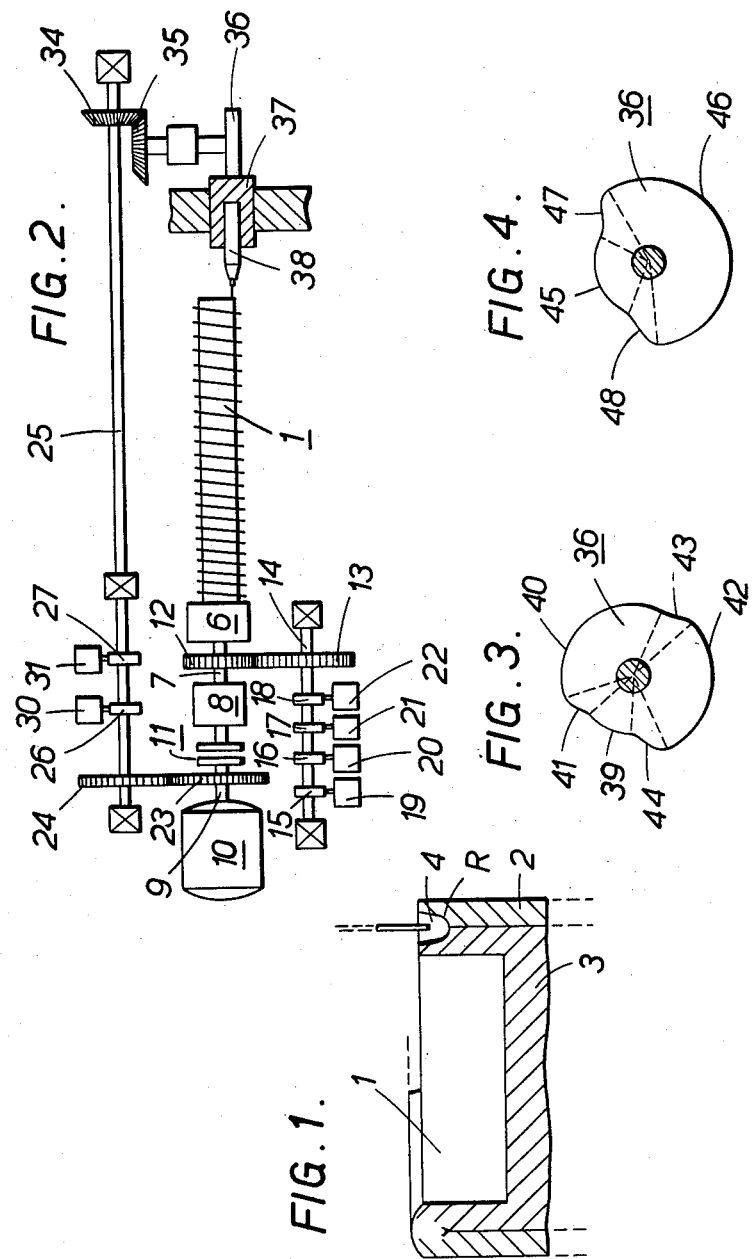

This invention relates to nuclear reactor fuel elements of the kind comprising a nuclear fuel member enclosed within a protective sheath.

In the manufacture of such elements it is the practice to use a tubular sheath closed at its ends by end-caps which are secured to the sheath by argon-arc edge welds, the preparation for the weld consisting of the formation of V-shaped grooves.

It has now been discovered that the reliability of such a weld is influenced by the depth of penetration of the weld and it has further been discovered that greater penetration, and hence greater reliability, can be obtained by having a weld preparation in the form of a U-shaped groove (which is wider than the tip of the welding electrode) and effecting the weld whilst the tip of the electrode of the welding torch is below the top of the U-groove.

The invention accordingly resides in a process of effecting an edge weld between two members comprising the steps of preparing the ends of the members to be welded to offer a U-shaped weld groove and making an inert-gas edge weld with the tip of the electrode of a welding torch below the top of the U-groove.

One way of carrying the invention into effect will now be described with reference to the accompanying drawings in which:

FIG. 1 is a sectional elevation of one end of a nuclear reactor fuel element.

FIG. 2 is a semi-schematic plan view of a fuel element welding machine for making welds in accordance with the invention.

FIGS. 3 and 4 show the profiles of alternative forms of a sequence cam embodied in the welding machine of FIG. 2.

In FIG. 1 there is shown one end of a nuclear reactor fuel element 1 having a magnesium alloy sheath 2 closed by a magnesium alloy end cap 3. (The sheath 2 and the end cap 3 may for example be made from the magnesium-beryllium alloy known as "Magnox" which is described in British Patent No. 776,649. Alternatively the sheath 2 and end cap 3 may be made from the magnesium-zirconium alloy known commercially as magnesium ZA alloy and containing zirconium in the range 0.05–1.0%, a specific example being 0.45–0.7%.)

The sheath 2 has a wall thickness of 0.060 inch and the end cap 3 is also of 0.060 inch wall thickness and 0.187 inch minimum internal height. The end cap 3 is a close fit in the end of the sheath 1 and the edge of the end cap 3 is flushed with the edge of the sheath 1. A U-shaped weld groove 4 is made in the flushed edges of the end cap 3 and the sheath 1. The radius 2 of the bottom of the U-shaped weld groove 4 is 0.030 inch about a centre 0.040 inch minimum below the top of the U-groove 4. The walls of the U-groove 4 are inclined so that each wall is inclined outwards 15° to the vertical and the width of the U-groove 4 at the top is 0.080 inch.

In FIG. 2 there is shown a welding machine for making an edge weld between the sheath 2 and the end cap 3 of the fuel element shown in FIG. 1. The machine comprises a chuck 6 for holding the fuel element 1, the chuck 6 being mounted on a shaft 7. The shaft 7 is also fitted with a brake 8 and can be coupled with the drive shaft 9 of a geared motor 10 by an electromagnetic clutch 11. The shaft 7 in coupled by gears 12 and 13 to drive a front shaft 14 which carries four cams 15, 16, 17 and 18 operating microswitches 19, 20, 21, and 22. The drive shaft 9 of the motor 10 is coupled by gears 23 and 24 to drive a backshaft 25 which carries two cams 26 and 27, operating microswitches 30, 31. The backshaft 25 is coupled by bevel gears 34 and 35 to drive a torch cam 36 which depending on the welding sequence is in one of the two forms shown in FIGS. 3 and 4. The torch cam 36 drives a slide 37 on which a welding torch 38 is mounted adjacent the end of the fuel element 1 which is to be welded. The welding torch 38 is of the shrouded type having a 20% thoriated tungsten electrode 1/8 of an inch in diameter ground down to 0.080 inch over the end 1/2 inch.

The torch 38 is powered by 110 volts A.C. suppressed and with timed pulse surge injection. Argon is supplied to the torch 38 at the rate of six litres per minute.

In use of the machine the fuel element 1 is loaded manually into the chuck 6 and the welding procedure is then as follows.

(1) The electrode of the torch 38 is set 0.003 inch beyond the top of the U-groove 4 using a feeler gauge.

(2) Operation of a start switch energises the motor 10 and initiates the arc (D.C. at 61 amps).

(3) Initially the motor 10 drives the backshaft 25 and hence the cam 36 governing movement of the torch 38. The cam 36 is of the form shown in FIG. 3 and has a "low" level profile 39 leading to an "intermediate" level profile 40 through a step 41, the intermediate level profile 40 leading to a "high" level profile 42 through a step 43 and the "high" level profile 42 leads back to the "low" level profile 39 through a step 44. The torch is driven 0.043 inch in towards the U-groove 4 by the step 41 on the cam 36 until the position of the torch 38 is governed by the "intermediate" level profile 40. Care is taken that the torch is driven into a central position in the groove 4 as shown in FIG. 1. The torch 38 is driven in over a period of 8 seconds, the clutch 11 being disengaged during this period so that the fuel element 1 remains stationary.

(4) The cam 26 on the backshaft 25 operates the microswitch 30 to energise the clutch 11 and rotate the chuck 6 and the frontshaft 14. The time for one revolution of the fuel element is 22 secs.

(5) The fuel element 1 is rotated for one revolution and 30° and then the step 43 on the cam 36 drives the torch 38 a further 0.010 inch into the U-groove 4 over a period of about 1 second until the position of the torch 38 is governed by the high level profile 42 of the cam 36.

(6) The fuel element 1 is rotated for another revolution plus 30° when the cam 16 on the frontshaft 14 operates the microswitch 20 to reduce the current to 35 amps in about 2 seconds. While the current is reducing the step 44 on the cam 36 steadily withdraws the torch 38 until the position of the torch is governed by the "low" level profile 39 of the cam 36.

(7) The cams 17 and 18 on the front shaft 14 respectively operate the microswitches 21 and 22 to switch off the welding current and de-energise the clutch 11. Finally the cam 27 on the backshaft 25 operates the microswitch 31 to switch off the motor 10.

Although the electrode of the welding torch 38 remains in the U-groove 4 during most of the welding operation the finished weld is found to fill the U-groove 4. The penetration of the weld into the contact zone between the sheath 1 and the end cap skirt 3 is typically 0.060 inch this representing a 50% increase in penetration without adding filler metal.

An alternative single run welding sequence is as follows.

(1) Set electrode of torch 38, 0.003 inch beyond the top of the U-groove 4.

(2) Energise the motor 10 and initiate the arc (64 amps D.C.).

(3) The motor 10 drives the backshaft 25 and hence the cam 36 governing movement of the torch 38. A cam 36 of the form shown in FIG. 4 is used. This cam 36 has a "low" level profile 45 leading to a "high" level profile 46 through intermediate steps 47 and 48. The torch 38 is driven 0.043 inch in towards the U groove 4 by the step 47 on the cam 36 until the position of the torch 38 is governed by the "high" level profile 46. The torch is driven in over a period of 8 seconds and the clutch 11 is disengaged during this period so that the fuel element 1 remains stationary.

(4) The cam 26 on the backshaft 25 operates the microswitch 30 to energise the clutch 11 and rotate the fuel element 1 and front shaft 14. The time for one revolution of the fuel element 1 is 30 seconds and rotation is started 6½ seconds after arc initiation.

(5) The fuel element 1 is rotated for one revolution plus 72° overlap and 26 seconds after arc initiation rotation of the cam 15 or the front shaft 14 operates the microswitch 19 to reduce the welding current from 64 amps to 58 amps over five seconds.

(6) After 38 seconds from arc initiation the cam 16 on the frontshaft 14 operates the microswitch 20 to reduce the current to 30 amps over four seconds and while the current is reducing the step 48 on the cam 36 steadily withdraws the torch 38 until the position of the torch 38 is governed by the "low" level profile 45 on the cam 36.

(7) The cams 17 and 18 on the frontshaft 14 respectively operate the microswitches 21 and 22 to switch off the welding current and de-energise the clutch 11. Finally the cam 27 on the backshaft 25 operates the microswitch 31 to switch off the motor 10.

The currents given in the above welding sequences are in respect of the welding of "Magnox" type magnesium alloy. For the welding of the type of magnesium alloy know as "ZA" a higher welding current is required—up to 80 amps maximum.

We claim:

1. A process of effecting an annular edge weld between a thin-walled cylindrical nuclear fuel element sheath and a thin-walled cylindrical end cap of the sheath, the sheath and end cap having adjacent butting side edges and substantially flush end edges, comprising: machining a U-shaped annular weld groove in adjacent butting edges of the sheath and end cap extending inwardly from the flush end edges, the walls of the U-groove being inclined outwardly from the longitudinal axis of the U-groove in passing outwardly from the curved base of the U-groove, and making an annular edge weld between the butting edges under a blanket of inert gas by relatively moving a non-consumable electrode around the annular U-groove with the tip of the electrode below the top of the U-groove.

2. A process as set forth in claim 1 wherein the combined thickness of the walls of the end cap and sheath in the vicinity of the groove is approximately 0.120 inch and the maximum width of the U-groove is approximately 0.080 inch with a minimum depth of approximately 0.070 inch, and wherein said sheath and end cap are rotated so as to have said annular groove move past the stationary electrode tip.

References Cited in the file of this patent

UNITED STATES PATENTS

| | | |
|---|---|---|
| 1,810,005 | Burnish | June 16, 1931 |
| 2,122,994 | Southgate | July 5, 1938 |
| 2,440,999 | Anderson | May 4, 1948 |
| 2,653,211 | Andrus | Sept. 22, 1953 |
| 2,915,815 | Bean et al. | Dec. 8, 1959 |

FOREIGN PATENTS

| | | |
|---|---|---|
| 791,011 | Great Britain | Feb. 19, 1958 |
| 837,930 | Great Britain | June 15, 1960 |
| 848,723 | Great Britain | Sept. 21, 1960 |
| 862,464 | Great Britain | Mar. 8, 1961 |

OTHER REFERENCES

2nd U.N. Conference on Peaceful Uses of Atomic Energy, September 1958, volume 6, page 345.